(12) United States Patent
Eddey et al.

(10) Patent No.: US 11,048,424 B1
(45) Date of Patent: Jun. 29, 2021

(54) FILE EXTRACTION OUT OF A BACKUP

(71) Applicant: AMAZON TECHNOLOGIES, INC., Seattle, WA (US)

(72) Inventors: Matthew James Eddey, Seattle, WA (US); John Sandeep Yuhan, Lynnwood, WA (US); Mahmood Miah, Seattle, WA (US); Abhishek Kumar, Buffalo, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1153 days.

(21) Appl. No.: 14/934,971

(22) Filed: Nov. 6, 2015

(51) Int. Cl.
*G06F 3/06* (2006.01)

(52) U.S. Cl.
CPC .............. *G06F 3/064* (2013.01); *G06F 3/061* (2013.01); *G06F 3/0643* (2013.01); *G06F 3/0673* (2013.01)

(58) Field of Classification Search
CPC ........ G06F 3/064; G06F 3/061; G06F 3/0643; G06F 3/0673; G06F 3/0604; G06F 3/0655; G06F 3/0661; G06F 3/0656; G06F 3/067; G06F 3/0683; G06F 11/1448; G06F 11/1471
See application file for complete search history.

(56) References Cited

U.S. PATENT DOCUMENTS

| | | | | |
|---|---|---|---|---|
| 7,069,401 | B1* | 6/2006 | Noonan | G06F 11/1461 707/999.202 |
| 9,021,198 | B1* | 4/2015 | Vijayan | G06F 3/067 711/112 |
| 9,274,956 | B1* | 3/2016 | Salyers | G06F 12/0808 |
| 9,507,784 | B2* | 11/2016 | Mukherjee | G06F 17/30091 |
| 2003/0088812 | A1* | 5/2003 | Lasser | G06F 11/1435 714/42 |
| 2007/0005904 | A1* | 1/2007 | Lemoal | G06F 3/061 711/137 |
| 2009/0164535 | A1* | 6/2009 | Gandhi | G06F 17/30067 |
| 2009/0307249 | A1* | 12/2009 | Koifman | G06F 3/0623 |
| 2014/0129524 | A1* | 5/2014 | Ueoka | G06F 11/1469 707/681 |

OTHER PUBLICATIONS

Englis Oxford Living Dictionary, https://en.oxforddictionaries.com/definition/us/capture, retrieved Jan. 2019.*

* cited by examiner

*Primary Examiner* — Michael Krofcheck
(74) *Attorney, Agent, or Firm* — Knobbe Martens Olson & Bear, LLP

(57) ABSTRACT

A system includes a storage volume configured to store a data set in a plurality of data blocks, a data store configured to store a plurality of captures of the data set in a plurality of data chunks, and file retrieval logic. The data set includes a file stored in a first data block of the plurality of data blocks. The file retrieval logic is configured to identify a first data chunk of the plurality of data chunks in which the first data block as captured in a first capture is stored in the data store, retrieve the first data chunk from the data store, and read the first data block as captured in the first capture from the first data chunk.

19 Claims, 11 Drawing Sheets

| File Name | Data Block |
|---|---|
| File 1 | Data Block 172 |
| File 2 | Data Block 174 |
| File N | Data Block N |

File Table 402

FILE EXTRACTION OUT OF A BACKUP

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as users or third parties.

Virtualized computing environments are frequently supported by block-level storage. Such block-level storage provides a storage system that is able to interact with various computing virtualizations through a series of standardized storage calls that render the block-level storage functionally agnostic to the structural and functional details of the volumes that it supports and the operating systems executing on the virtualizations to which it provides storage availability.

BRIEF DESCRIPTION OF THE DRAWINGS

For a detailed description of various examples, reference will now be made to the accompanying drawings in which.

DETAILED DESCRIPTION

Figure 1:
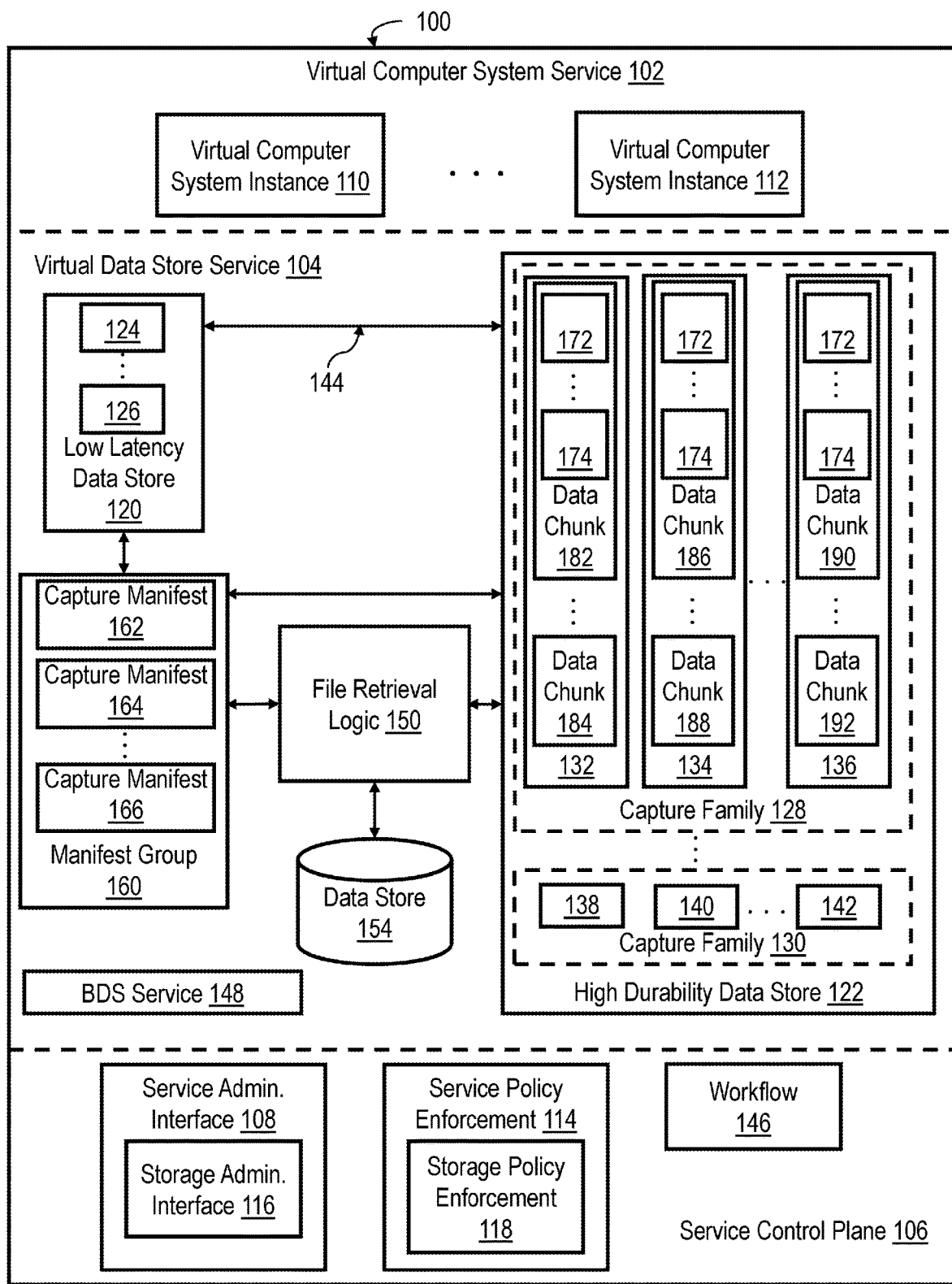
FIG. 1 shows a block diagram depicting aspects of an example distributed program execution service in accordance with at least one embodiment.

Techniques, including systems and methods, of the present disclosure provide tools enabling the retrieval of specific files and file versions of stored backup data. In an embodiment, captures (i.e., snapshots) of data sets stored in block-level storage devices are taken at the block-level. At least some of the captures are maintained or stored in a data store to provide backup for the data set. A capture is a representation of a data set at a point in time. A capture may include information from which the data set may be reconstructed at a later time and/or may include the data set itself. The data set may be in the form of a set of data blocks where each data block is a sequence of bytes or bits having a nominal length. For example, a data block may be 256 bytes in length, 512 bytes in length, 1024 bytes in length, etc. The blocks may be stored by a block storage device which may be a physical storage device or a virtual storage device. Once a data set is captured, the capture may be stored in data chunks of a high durability data store. Each data chunk may include a sequence of bytes or bits having a nominal length which, in some embodiments, is larger than the data blocks that store the data set. For example, a data chunk may be N data blocks in length, where N>1. The high durability data store may be an archive quality data store. For example, to increase durability, the high durability data store may allow for the captures to be stored across multiple facilities and on multiple devices within each facility.

After the captures of the data set are stored in the high durability data store, a user and/or a client may request access to a single file from a single capture stored in the high durability data store or multiple file versions of the file. In the conventional system, the entire capture or multiple captures must be reconstituted in their entirety as separate volumes in order to access the requested file or file versions. However, by utilizing a capture manifest and/or capture manifests, file retrieval logic may identify in which data chunk or data chunks in the high durability data store the file or file versions are stored. A capture manifest may map each data block of a particular capture to the data chunk in which it is stored. The file retrieval logic then may retrieve the identified data chunk or chunks from the high durability data store. The data chunk or chunks may then be, in some embodiments, provided, for example by streaming through a memory of the file retrieval logic, and the data blocks in which the requested file and/or file versions are stored may then be extracted. The file and/or file versions then may be stored in a data store accessible to the requesting user and/or client. In this way, archived files from specific captures may be extracted and made available to a user and/or client without having to reconstitute the entire capture in a storage volume. Thus, the requirement to utilize expensive resources reconstituting one or more entire captures in volumes is removed.

In much of the following description, a provider network is used as an example of a distributed system in which the centralized networking configuration techniques may be implemented. Virtual networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for user use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "user," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. The term "client," when used as the source or destination of a given communication, may refer to a virtual machine instance attached to a user. For example, a user may make a request on a client which then may communicate with other aspects of the provider network to complete the request.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to users. Other services of the provider network may be accessed from such compute instances as well as from external locations. It is noted that although provider networks serve as one example context in which many of the retrieval techniques described herein may be implemented, those techniques may also be applied to other types of distributed systems than provider networks, e.g., to large-scale distributed application environments in which different components of the applications may have time-varying bandwidth needs.

FIG. 1 depicts aspects of an example distributed program execution service 100 in accordance with at least one embodiment. The distributed program execution service 100 provides virtualized computing services, including a virtual computer system service 102 and a virtual data store service 104, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers, one or more data stores, as well as communication bandwidth in the interlinking network. The computing resources managed by the distributed program execution service 100 are not shown explicitly in FIG. 1 because it is an aspect of the distributed program execution service 100 to emphasize an independence of the virtualized computing services from the computing resources that implement them.

The distributed program execution service 100 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 100 may supply computing resources elastically and/or on-demand, for example, associated with a per resource unit commodity-style pricing plan.

The distributed program execution service 100 may further utilize the computing resources to implement a service control plane 106 configured at least to control the virtualized computing services. The service control plane 106 may include a service administration interface 108. The service administration interface 108 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 102 may provision one or more virtual computer system instances 110, 112. The user may then configure the provisioned virtual computer system instances 110, 112 to execute the user's application programs. The ellipsis between the virtual computer system instances 110 and 112 indicates that the virtual computer system service 102 may support any suitable number (e.g., thousands, millions, and more) of virtual computer system instances although, for clarity, only two are shown.

The service administration interface 108 may further enable users and/or administrators to specify and/or re-specify virtualized computing service policies. Such policies may be maintained and enforced by a service policy enforcement component 114 of the service control plane 106. For example, a storage administration interface 116 portion of the service administration interface 108 may be utilized by users and/or administrators of the virtual data store service 104 to specify virtual data store service policies to be maintained and enforced by a storage policy enforcement component 118 of the service policy enforcement component 114. Various aspects and/or facilities of the virtual computer system service 102 and the virtual data store service 104 including the virtual computer system instances 110, 112, the low latency data store 120, the high durability data store 122, the file retrieval logic 150, data store 154, and/or the underlying computing resources may be controlled with interfaces such as application programming interfaces (APIs) and/or Web-based service interfaces. In at least one embodiment, the control plane 106 further includes a workflow component 146 configured at least to interact with and/or guide interaction with the interfaces of the various aspects and/or facilities of the virtual computer system service 102 and the virtual data store service 104 in accordance with one or more workflows.

In at least one embodiment, service administration interface 108 and/or the service policy enforcement component 114 may create, and/or cause the workflow component 146 to create, one or more workflows that are then maintained by the workflow component 146. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 108. As another example, a policy enforcement workflow may be created from a policy enforcement workflow template configured with parameters by the service policy enforcement component 114.

The workflow component 146 may modify, further specify and/or further configure established workflows. For example, the workflow component 146 may select particular computing resources of the distributed program execution service 100 to execute and/or be assigned to particular tasks. Such selection may be based at least in part on the computing resource needs of the particular task as assessed by the workflow component 146. As another example, the workflow component 146 may add additional and/or duplicate tasks to an established workflow and/or reconfigure information flow between tasks in the established workflow. Such modification of established workflows may be based at least in part on an execution efficiency analysis by the workflow component 146. For example, some tasks may be efficiently performed in parallel, while other tasks depend on the successful completion of previous tasks.

The virtual data store service 104 may include multiple types of virtual data stores such as a low latency data store 120 and a high durability data store 122. For example, the low latency data store 120 may maintain one or more data sets 124, 126 which may be read and/or written (collectively, "accessed") by the virtual computer system instances 110, 112 with relatively low latency. The ellipsis between the data sets 124 and 126 indicates that the low latency data store 120 may support any suitable number (e.g., thousands, millions, and more) of data sets although, for clarity, only two are shown. Each of the data sets 124, 126 may be comprised of any amount of data and may include any number of specific files. For each data set 124, 126 maintained by the low latency data store 120, the high durability data store 122 may maintain a set of captures (e.g., captures 132, 134, 136 for data set 124 and captures 138, 140, 142 for data set 126) that may make up a capture family (e.g., capture family 128 for data set 124 and capture family 130 for data set 126). Each capture family 128, 130 may maintain any suitable number of captures 132, 134, 136 and 138, 140, 142 of its associated data set 124, 126, respectively, as indicated by the ellipses. Each capture 132, 134, 136 and 138, 140, 142 may provide a representation of the respective data set 124 and 126 at a particular point in time. Such captures 132, 134, 136 and 138, 140, 142 may be utilized for later inspection including restoration of the respective data set 124 and 126 and/or specific files and/or version histories from any of the captures to its state at the captured point in time. Although each component of the distributed program execution service 100 may communicate utilizing the underlying network, data transfer 144 between the low latency data store 120 and the high durability data store 122 is highlighted in FIG. 1 because the contribution to utilization load on the underlying network by such data transfer 144 can be significant.

For example, the data sets 124, 126 of the low latency data store 120 may be virtual disk files (i.e., file(s) that can contain sequences of bytes that represent disk partitions and file systems) or other logical volumes. The low latency data store 120 may include a low overhead virtualization layer providing access to underlying data storage hardware. For example, the virtualization layer of the low latency data store 120 may be low overhead relative to an equivalent layer of the high durability data store 122. In at least one embodiment, the sets of underlying computing resources allocated to the low latency data store 120 and the high durability data store 122, respectively, are substantially disjoint. In a specific embodiment, the low latency data store 120 could be a Storage Area Network target or the like. In this exemplary embodiment, the physical computer system that hosts the virtual computer system instance 110, 112 can send read/write requests to the SAN target.

The low latency data store 120 and/or the high durability data store 122 may be considered non-local and/or independent with respect to the virtual computer system instances 110, 112. For example, physical servers implementing the virtual computer system service 102 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 110, 112 may have a validity lifetime corresponding to the virtual computer system instance 110, 112, so that if the virtual computer system instance 110, 112 fails or is de-provisioned, the local data is lost and/or becomes invalid. In at least one embodiment, data sets 124, 126 in non-local storage may be efficiently shared by multiple virtual computer system instances 110, 112. For example, the data sets 124, 126 may be mounted by the virtual computer system instances 110, 112 as virtual storage volumes.

Data stores in the virtual data store service 104, including the low latency data store 120 and/or the high durability data store 122, may be facilitated by and/or implemented with a block data storage (BDS) service 148, at least in part. The BDS service 148 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may, in some embodiments, be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 148 may facilitate and/or implement local caching of data blocks as they are transferred through the underlying computing resources of the distributed program execution service 100 including local caching at data store servers implementing the low latency data store 120 and/or the high durability data store 122, and local caching at virtual computer system servers implementing the virtual computer system service 102. In at least one embodiment, the high durability data store 122 is an archive quality data store implemented independent of the BDS service 148. The high durability data store 122 may work with sets of data that are large relative to the data blocks manipulated by the BDS service 148. The high durability data store 122 may be implemented independent of the BDS service 148 (e.g., with distinct interfaces, protocols and/or storage formats).

Figure 2:
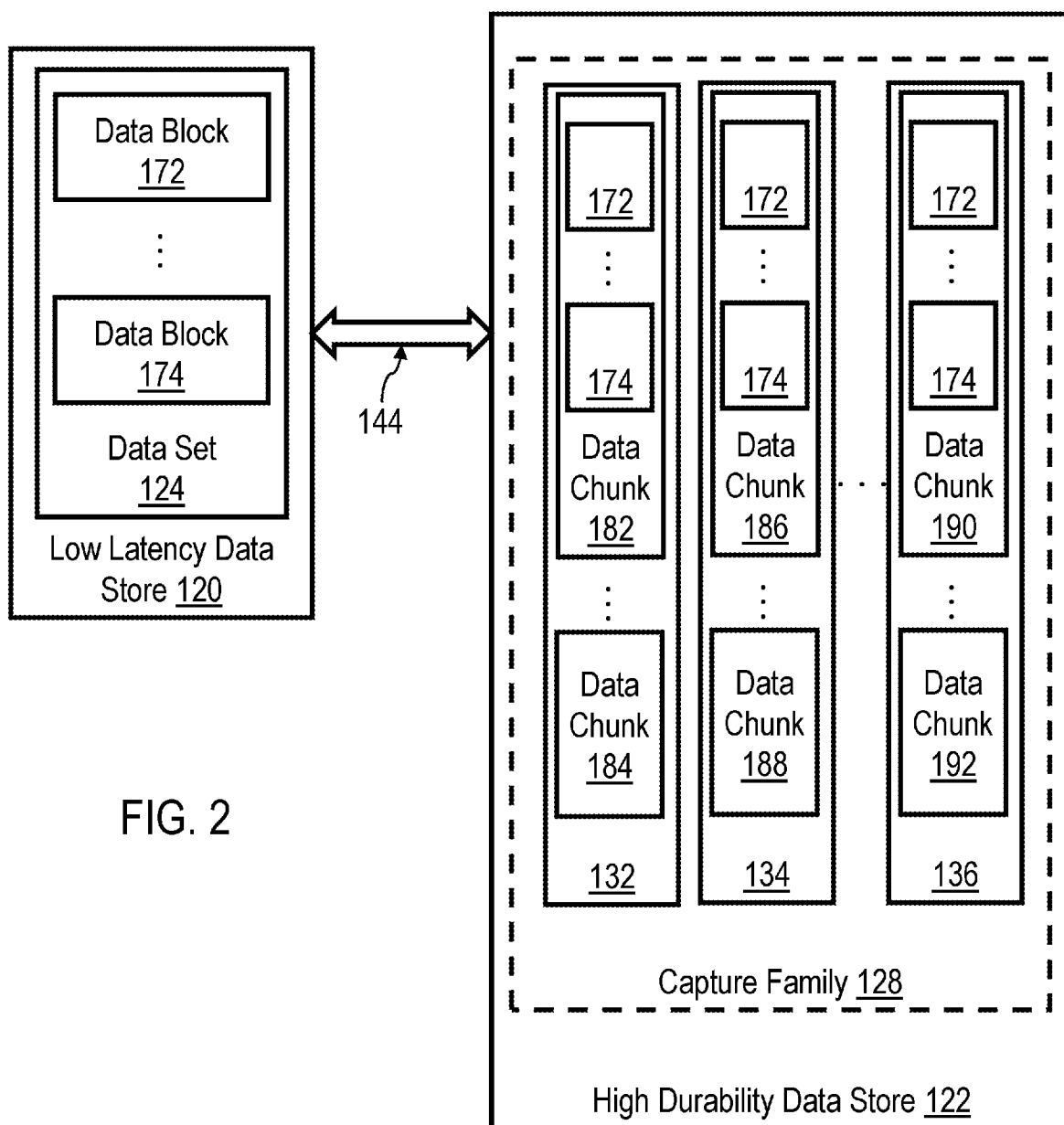
FIG. 2 shows a block diagram depicting aspects of an example service for storing captured data blocks of a data set into a data store in accordance with various embodiments.

As described above, an initial capture 132 of the data set 124 may involve a substantially full copy of the data set 124 and transfer 144 through the network to the high durability data store 122 (may be a "full capture"). In a specific example, this may include taking a snapshot of the blocks that make up a virtual storage volume. Data transfer between the low latency data store 120 and high durability data store 122 may be orchestrated by one or more processes of the BDS service 148. For example, FIG. 2 shows a block diagram depicting aspects of an example service for storing captured data blocks 172, 174 of data set 124 into high durability data store 122 in accordance with various embodiments. In this example, data set 124 is stored in data blocks 172, 174 of the low latency data store 120. The ellipsis between the data blocks 172 and 174 indicates that the data set 124 may support any suitable number (e.g., thousands, millions, and more) of data blocks although, for clarity, only two are shown. Each data block 172, 174 stores data that form data set 124. In some embodiments, a single file of the data set 124 may be stored in a single data block 172; however, in alternative embodiments, a single file may be stored across multiple data blocks 172, 174. Each data block 172, 174 may be transferred 144 to the high durability data store 122. Thus, a snapshot at different points in time may be taken of each data block 172, 174 and stored in respective captures 132, 134, 136 of the capture family 128. Each of the data blocks 172, 174 may be stored in data chunks of the high durability data store 122. For example, data blocks 172, 174, captured in capture 132, may be stored in data chunk 182 while being stored in data chunk 186 for capture 134 and data chunk 190 for capture 136. Thus, the contents of data blocks 172, 174 at different points in time may be stored in different data chunks of the high durability data store 122. Each data chunk 182, 184, 186, 188, 190, 192 is a sequence of bytes or bits having a nominal length which, in some embodiments, is larger than the data blocks 172, 174 that store the data set 124. In this way, each of the data blocks 172, 174 that store the data set 124 may be captured at different points in time and stored in the high durability data store 122.

Returning to FIG. 1, as another example, a virtual disk (storage volume) may be transferred to a physical computer hosting a virtual computer system instance 110. A hypervisor may generate a write log that describes the data and location where the virtual computer system instance 110 writes the data. The write log may then be stored by the high durability data store 122 along with an image of the virtual disk when it was sent to the physical computer.

The data set 124 may be associated with various kinds of metadata. Some, none or all of such metadata may be included in a capture 132, 134, 136 of the data set 124 depending on the type of the data set 124. For example, the low latency data store 120 may specify metadata to be included in a capture depending on its cost of reconstruction in a failure recovery scenario. Captures 134, 136 beyond the initial capture 132 may be "incremental", for example, involving a copy of changes to the data set 124 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 132, 134, 136 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 134, 136, utilization load on the underlying computing resources can be significantly less for incremental captures compared to full captures.

For example, a capture 132, 134, 136 of the data set 124 may include read access of a set of servers and/or storage devices implementing the low latency data store 120, as well as write access to update metadata, for example, to update a data structure tracking "dirty" data blocks of the data set 124. For the purposes of this description, data blocks of the data set 124 are dirty (with respect to a particular class and/or type of capture) if they have been changed since the most recent capture (of the same class and/or type). Prior to being transferred 144 from the low latency data store 120 to the high durability data store 122, capture 132, 134, 136 data may be compressed and/or encrypted by the set of servers. At the high durability data store 122, received capture 132, 134, 136 data may again be written to an underlying set of servers and/or storage devices. Thus each capture 132, 134, 136 involves a load on finite underlying computing resources including server load and network load. It should be noted that, while illustrative embodiments of the present disclosure discuss storage of captures in the high durability data store 122, captures may be stored in numerous ways. Captures may be stored in any data store capable of storing captures including, but not limited to, low-latency data stores and the same data stores that store the data being captured.

Captures 132, 134, 136 of the data set 124 may be manually requested, for example, utilizing the storage administration interface 116. In at least one embodiment, the captures 132, 134, 136 may be automatically scheduled in accordance with a data set capture policy. Data set capture policies in accordance with at least one embodiment may be specified with the storage administration interface 116, as well as associated with one or more particular data sets 124, 126. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Flexible data set capture policies may specify that a capture is to occur within a particular time window (e.g., 2 am-6 am every day, sometime on Sunday, after close of business on the last day of the month) or with a particular frequency (e.g., once per hour, twice per day, once per week, once per month). In at least one embodiment, flexible data set capture policies may specify that captures be scheduled to meet suitable goals, targets and/or conditions (collectively, "capture conditions"). For example, each capture 132, 134, 136 may have an associated cost, financially and/or in terms of computational resources, and the flexible data set capture policy may specify a cost target and/or cost cap for the capture 132, 134, 136 or capture family 128 including a budget per time period and/or an average cost per capture. As another example, in at least one embodiment, a probability of data loss of a portion of a data set 124 is a function at least of an amount of uncaptured data in the data set 124 at a given time. Accordingly, a flexible data set capture policy may specify a target probability of data loss of a portion of the data set 124, and the storage policy enforcement component 118 may schedule captures of the data set 124 to meet the target by keeping the amount of uncaptured data in the data set 124 below an associated uncaptured data target and/or cap.

Data set capture policies may specify any suitable combination of fixed schedules, flexible schedules, and capture conditions. Data set capture policies may further specify capture lifetimes and/or capture retention goals, targets and/or conditions. For example, a seven day lifetime may be specified for daily captures, a four week lifetime may be specified for weekly captures, and/or an annual lifetime may be specified for monthly captures. Captures may have an unspecified and/or unlimited lifetime, thus requiring manual deletion. Furthermore, particular captures may be protected, for example, may require manual deletion by a designated set of authenticated users. Captures 132, 134, 136 and/or capture family 128, 230 may be associated with costs (e.g., a periodic fee for storage per gigabyte), and the data set capture policy may specify that captures 132, 134, 136 be automatically deleted to meet a cost target and/or cap. Enforcement of data capture retention policies may analyze associated capture family 128, 130 to prioritize deletion of redundant captures and/or prohibit deletion of a capture that would prevent restoration of the data set 124 to its state in time corresponding to the most recent capture 132.

Figure 3:
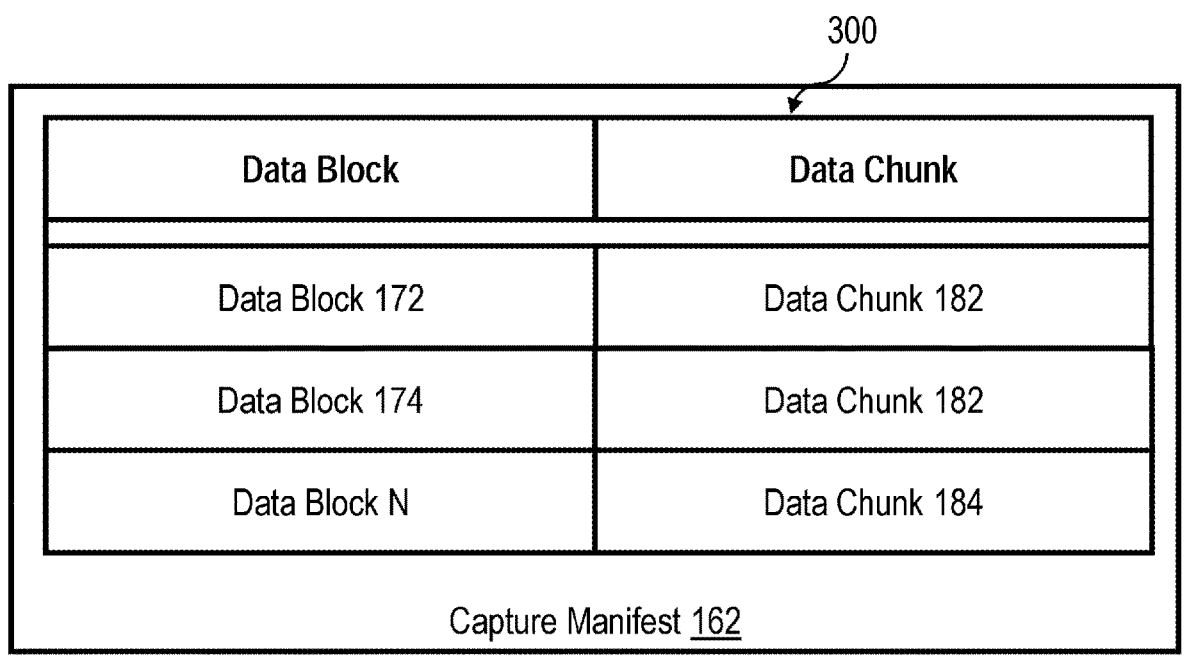
FIG. 3 shows an example capture manifest that may be utilized for retrieving one or more files from stored captured data in accordance with various embodiments.

At the time each capture 132, 134, 136 is stored in the high durability data store 122 a corresponding capture manifest 162, 164, 166 may be created. For example, at the time capture 132 is stored in high durability data store 122; corresponding capture manifest 162 is created. Similarly, at the time captures 134, 136 are stored in high durability data store 122, corresponding capture manifests 164, 166 are created. These capture manifests 162, 164, 166 may make up a manifest group 160 that stores each of the capture manifests corresponding to each of the captures of capture family 128. Each capture manifest 162, 164, 166 may comprise a table that maps each data block 172, 174 captured in their respective captures 132, 134, 136 to a corresponding data chunk (e.g., data chunks 182, 184, 186, 188, 190, 192) where the data block is stored in the high durability data store 122. For example, FIG. 3 shows an example capture manifest 162 that may be utilized for retrieving one or more files from stored captured data in accordance with various embodiments. As discussed previously, capture manifest 162 corresponds with capture 132 and comprises the table 300 that maps each of the data blocks 172, 174 captured in capture 132 to the data chunk of high durability data store 122 in which it is stored. Thus, in this example, because data blocks 172, 174 are stored in data chunk 182, the data 300 maps data blocks 172, 174 to data chunk 182. Table 300 may further map data block N to any of the other data chunks where data blocks captured in capture 132 are stored (e.g., data chunk 184). In some embodiments, the capture manifest 162 may additionally map the specific bits and/or bytes in which the data blocks 172, 174 captured in capture 132 are stored in the data chunk. In some embodiments, capture manifest 162,164, 166 may be stored in the high durability data store 122 and more particularly, may be stored in a data chunk in which the capture is stored. For example, capture manifest 162 may be, in an embodiment, stored in data chunk 182, the same data chunk in which the capture manifest 162 maps data blocks to data chunks.

Returning to FIG. 1, file retrieval logic 150 may be any software or hardware configuration that is configured to retrieve a single file or multiple versions of a file from one or more captures 132, 134, 136 stored in high durability data store 122. In an embodiment, the file retrieval logic 150, which may be connected to a number of other computer systems via a network (not shown) (e.g., the Internet), including additional computing systems that may be operated by third parties, may receive a retrieval request. The retrieval request may request the retrieval of a specific file captured in one of the captures stored in high durability data store 122 and/or it may request file versions for a file captured in various captures (e.g., captures 132, 134, 136). For example, file retrieval logic 150 may receive a request from a client to retrieve a file from capture 132. In another example, file retrieval logic 150 may receive a request from a client to retrieve file versions for a file from a number of captures 132,134, 136 stored in the high durability data store 122. In some embodiments, the retrieval request may take the form of an API instruction received from the client. More specifically, a user may make a retrieval request utilizing a client to interact with the file retrieval logic 150.

Figures 4, 5:
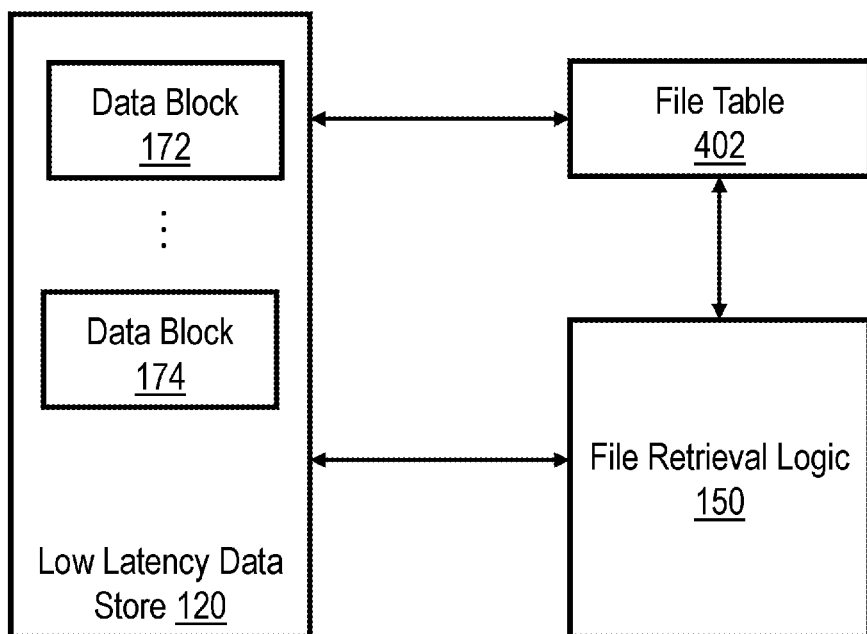
FIG. 4 shows a block diagram depicting aspects of an example service for storing file locations in a file table in accordance with various embodiments.
FIG. 5 shows an example file table that may be utilized for storing file locations in a data store in accordance with various embodiments.

File retrieval logic 150 may first determine where the file is stored or has been stored in the low latency data store 120. In some examples, a file table may be utilized to determine in which data block or data blocks 172, 174 the file is stored or has been stored. For example, FIG. 4 shows a block diagram depicting aspects of an example service for storing file locations in a file table 402 in accordance with various embodiments. In this example, a file is stored in data block 172 of the low latency data store 120. In alternative examples, the file may be stored in more than a single data block. At the time the file is created and stored in the data block 172, or anytime the file changes locations to another data block of the low latency data store 120, the file table 402 stores the location of the file in the low latency data store 120. For example, FIG. 5 shows an example file table 402 that may be utilized for storing file locations in a low latency data store 120 in accordance with various embodiments. In this example, File 1 is located in data block 172; therefore, the file table 402 maps File 1 to data block 172. Similarly, File 2 is located in block 174 and File N is located in data block N; therefore, File 2 is mapped to data block 174 while File N is mapped to data block N in file table 402. In FIG. 4, the file retrieval logic 150 may access the file table 402 to identify where the file is stored or has been stored in the low latency data store 120 for each of the captures 132, 134, 136. In alternative embodiments, file retrieval logic 150 may, instead of utilizing file table 402, determine the location of the file within low latency data store 120 utilizing a file system driver. For example, the file retrieval logic 150 may determine the type of file system that is stored in low latency data store 120. A superblock which contains the file tree for the files stored in the data blocks 172, 174 is accessed and read by the file retrieval logic 150. A file system driver corresponding to the file type then may traverse the file tree and determine the location of the file (e.g., which data blocks) within low latency data store 120.

Figure 6:
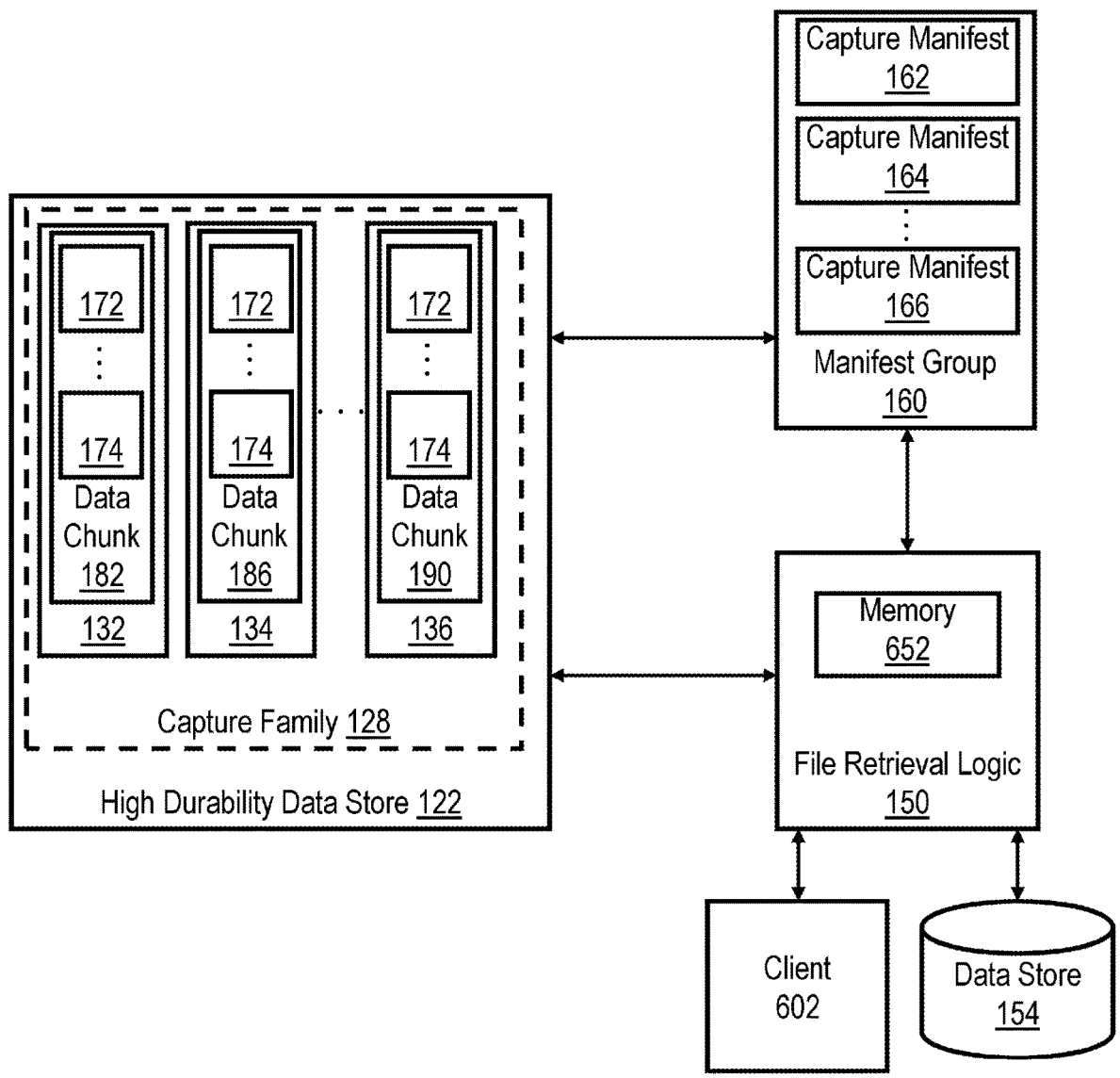
FIG. 6 shows a block diagram depicting aspects of an example service for retrieving one or more files from stored captured data in accordance with various embodiments

Returning to FIG. 1, after determining the location (e.g., the data block) of the low latency data store 120 in which the file requested by the client is located, the file retrieval logic 150 then may identify the data chunk or data chunks in which the captured data block from the low latency data store 120 is stored in the high durability data store 122. For example, the file retrieval logic 150 may determine that the file requested by the client is stored in data block 172 of the low latency data store 120. FIG. 6 shows a block diagram depicting aspects of an example service for retrieving one or more files from stored captured data in accordance with various embodiments. The file retrieval logic 150 utilizes the capture manifest 162, 164, 166 corresponding to the capture 132, 134, 136 from which the client requests the file to determine which data chunk or data chunks in the high durability data store 122 the data block is stored. In this example, data block 172 has been captured multiple times and stored in data chunks 182, 186, 190. If the client, such as client 602, requests the file from capture 132, then the file retrieval logic 150 identifies data chunk 182. If the client 602 has requested various file versions, then the file retrieval logic 150 may identify multiple data chunks (e.g., data chunks 182, 186, 190) where the data block 172 is stored for various captures 132, 134, 136 corresponding to the file versions requested. File retrieval logic 150 then may retrieve the identified data chunk or data chunks (in this example, data chunk 182 for retrieval of one requested file from capture 182 and data chunks 182, 186, and 190 for retrieval of file versions from captures 182, 186, 190) into a memory 652 that is a component of file retrieval logic 150. Because the capture manifest 162, 164, 166 may be stored in a data chunk of the high durability data store 122, the file retrieval logic 150 may already have retrieved the data chunk in which the file is stored, thus, optimizing the system. For example, if the capture manifest 162 is stored in data chunk 182, then file retrieval logic 150 may retrieve data chunk 182 to retrieve the capture manifest 162. The file retrieval logic 150 then may determine that the file is stored in data block 172 in data chunk 182 which has already been retrieved and ready to be read by file retrieval logic 150.

The data block, as captured in the requested capture, is then read from the memory 652. For example, the data chunk 182 and/or data chunks 182, 186, 190 may be streamed through the memory 652 and the data block 172 may be extracted from the memory 652 by the file retrieval logic 150. In some embodiments, because the capture manifest 162 and/or capture manifests 162, 164, 166 may map the specific bits and/or bytes in which the data block 172 captured in capture 132 and/or captures 132, 134, 136 is stored, the file retrieval logic may extract those bits and/or bytes as they stream through the memory. Similarly, if a requested file is located across multiple data blocks, such as data blocks 172, 174, those data blocks, as captured in the requested capture, are read from the memory 652 and the file then may be reconstructed by file retrieval logic 150. In this way, the requested file and/or file versions may be retrieved. In some embodiments, the requested file and/or file versions then may be stored in data store 154 which may also be connected to a network (not shown) so that the file may be accessed by the client. In alternative embodiments, the requested file and/or file version may be streamed directly to the client 602 from the memory 652, as extracted by file retrieval logic 150, with or without being stored first. As explained herein, the requested file and/or file version may be provided to the client 602 in a number of different ways, including by having the file and/or file version read from memory or streamed to the client 602.

In some embodiments, the various file versions may be compared by the file retrieval logic 150. For example, once the file retrieval logic 150 has extracted the files from the data chunks 182, 186, 190 multiple versions of the same file (i.e., three versions of the file captured at different points in time) may be compared with one another. In some embodiments, the differences between the various file versions may be stored in data store 154 so that the differences may be accessed by the client; while in alternative embodiments, the differences may be streamed directly to the client 602 as they are determined by the file retrieval logic 150. The differences may include the actual files themselves, a link to the actual files themselves, the actual differences in the file, a listing of which capture the file versions have been extracted from (e.g., file version 1 is from capture 132, file version 2 is from capture 134, file version 3 is from capture 136, etc.). Additionally, the file retrieval logic 150 may compare the various file versions while the data chunks are read from the memory 652. For example, file retrieval logic 150 may compare a first file version captured in capture 132 with a second file version captured in capture 134 while data chunk 190 is streaming through memory 652. This may enable the comparison to be completed in timely fashion.

As discussed, various embodiments of the present disclosure provide techniques for utilizing block-level captures of data sets stored using block storage devices, which can include, for example, physical block storage devices and/or virtualized block storage devices. A virtualized block device is an example of a computing resource that can be offered as a computing service. Users of virtualized volumes may create, delete, resize and otherwise reconfigure virtual volumes without concern for the details of how underlying computing resources are allocated. Users may also capture data sets stored in a virtual file system, where a capture of a data set is a representation of a data set at a point in time. Multiple captures of a particular data set may be taken at various points in time, and later captures may depend on one or more earlier captures. For example, an initial capture of the data set may involve making a full copy of the data set, whereas a later capture of the data set may involve copying data that has changed since an earlier capture. When needed for various reasons, captures may be reconstituted into volumes. Additionally, specific files and/or file versions may be retrieved from specific captures so that the files and/or file versions are accessible to the client.

Figure 7:
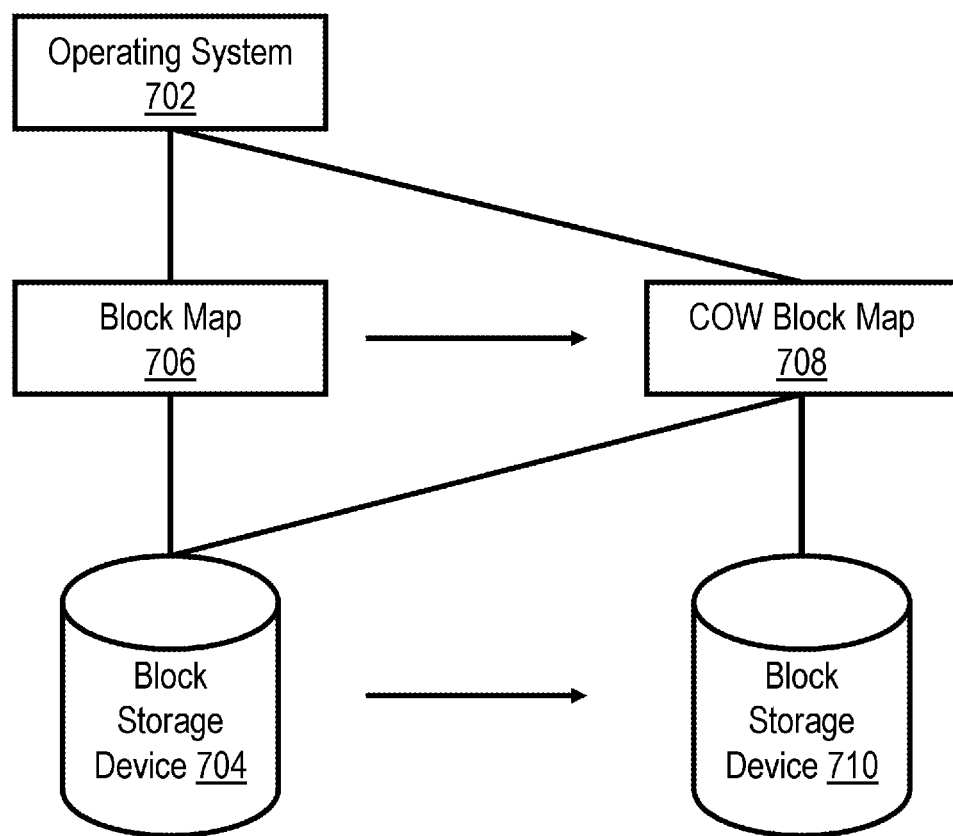
FIG. 7 shows a block diagram depicting aspects of an example service for capturing data in accordance with various embodiments.

FIG. 7 shows a diagram representing one way in which data set captures may be taken. In FIG. 7 an operating system 702 has access to a block storage device 704. It should be noted, however, that hypervisors (virtual machine managers) may also have access to the block storage device 804 in various embodiments that utilize virtualization. The block storage device 704 may be virtually or physically mounted to a computing machine (virtual or physical) on which the operating system executes. To access the block storage device 704, the operating system 702 may utilize a block map 706. The block map 706 may be a mapping of blocks of data to locations of the block storage device 704. In an embodiment where the block storage device is a physical hard drive, the block map 706 may associate data blocks with physical locations of the block storage device. In embodiments where the block storage device 704 is a virtual block storage device, the block map 706 may map blocks of data to virtual locations of the block storage device 704. In some embodiments, the block map 706 is the file table 402.

In an embodiment, as illustrated in FIG. 7, when a capture of a data set is stored by the block storage device 704, a copy on write (COW) block map 708 may be generated. The COW block map 708 may be a copy of the block map 706 at a time of the capture. After the capture, when a write is issued to the block storage device 704, if the write will affect an existing data block, the existing data block is copied to a second block storage device 710 and the COW block map 408 is updated to point to the location in the second block storage device 710 instead of the original location in the block storage device 704 at the time of the capture. In this manner, only data that has changed since the capture need be copied to the second block storage device 710. Additional captures may be made in the same or in a similar manner. Variations of the process illustrated in FIG. 7 are also considered as being within the scope of the present disclosure, including existing variations on copy on write techniques.

Various techniques for managing data set capturing may be used. For example, in an embodiment, data set captures are performed according to a capture schedule, which may be according to a periodic schedule, such as every ten minutes. A capture of the data set may be made at times specified by the schedule. Each capture may be made by recording changes made to the data set since the last capture was completed. In this manner, a volume may be reconstituted to a particular point in time corresponding to a capture by constructing the data set using all captures made at and before the particular point in time. High capture frequency may be achieved using this technique (and variations thereof) because, the higher the frequency at which captures are taken, the lower the number of changes to the data set that are possible. In other words, the less time between captures, the less time each capture takes.

Captures may also be taken based at least in part on various triggers. For instance, each write may trigger a capture. As discussed below, a write journal may be used to take a capture at every write. A number of input/output operations may also trigger a capture. A certain amount of data having been changed since a last capture is another example of a condition that may trigger a capture. Generally, any set of one or more conditions may trigger a capture when fulfilled. Further, the triggers may be configurable by various users, such as by customers of a virtual resource provider. Customers may be provided the ability through an application programming interface (API) or other interface to specify the conditions for when captures should be taken. For instance, a customer may specify that a capture should be taken every n writes (n being an integer). Data set captures may also be provided as a service and customers of the service may selectively choose when captures should and should not be taken. A virtual resource provider may charge customers based on one or more factors including, but not limited to, the number of captures taken, the amount of data captured, the number of writes captured, an amount of time capturing is "turned on" by the customer, and the like.

Captures may also be taken without knowledge of the customers or other users of the data sets being captured. A virtual resource provider may, for instance, capture data sets of customers in a manner that is not apparent to the customers. If the customer exhibits behavior (i.e. use of resources) that indicates illegal activity and/or activity that violates one or more terms and conditions to which the customer agrees, captures may be examined to confirm such activity to enable the virtual resource provider to take appropriate action, such as alerting authorities, revoking resources, and the like. As another example, if a customer contacts the virtual resource provider with a complaint or concern, captures may be analyzed to attempt to determine a reason for the customer complaint or concern. Analysis of a capture may, for example, indicate that the customer allowed its resources to be compromised.

Figure 8:
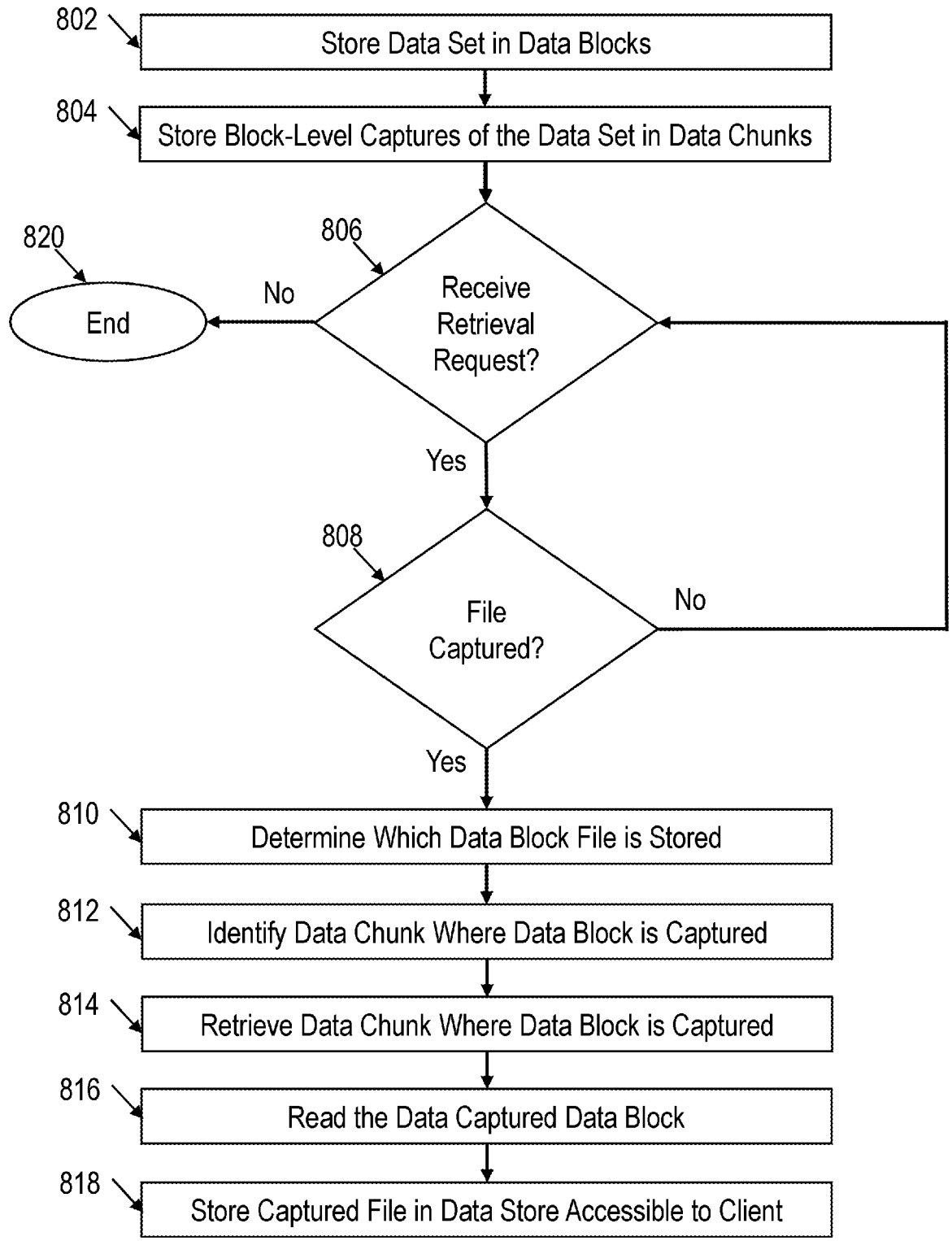
FIG. 8 shows a flow diagram illustrating aspects of operations that may be performed to retrieve a file from stored captured data in accordance with various embodiments.

FIG. 8 shows a flow diagram illustrating aspects of operations that may be performed to retrieve a file from stored captured data in accordance with various embodiments. As shown in element 802, a data set is stored in multiple data blocks of a storage volume in a block storage device. For example, data set 124 may be stored in low latency data store 120. In some embodiments, one of the files of the data set may be stored in one of the data blocks of the storage device. In element 804, multiple block-level captures of the data set are stored in a plurality of data chunks of a data store. In some embodiments, the data store in which the captures are stored is a high durability data store. Because the data set includes the file stored in the data block, the captures include the file captured at different points in time. In element 806, a determination is made as to whether a file retrieval request has been received from a client requesting the retrieval of a file that is stored in a block-level capture. The block-level capture may include a snapshot of the file at a particular point in time and may be stored in one or more data chunks of a high durability data store, such as high durability data store 122. The request may be received by file retrieval logic residing in a virtual data store service of a distributed computing system. If in element 806, a file retrieval request has not been received, then the process ends in block 820.

If however, in element 806, a file retrieval request has been received, in element 808 a determination is made as to whether the file requested has been captured and stored in the high durability data store. If in element 808, the file requested has not been captured or stored in the high durability data store, then the process resumes at element 806 with determining whether another file retrieval request has been received.

If, however, in element 808, the file requested has been captured and stored in the high durability data store, in element 810, a determination is made, in some embodiments by the file retrieval logic, as to which data block residing in a low latency data store (e.g., a block storage device) the file is stored. In some embodiments, the file retrieval logic may utilize a file table, such as file table 402 that maps files to the data blocks in which the files are, to determine which data block of the low latency data store the file is stored. In element 812, the data chunk of a high durability data store that stores a capture of the data block is identified, in some embodiments, by the file retrieval logic utilizing a capture manifest (e.g., capture manifest 162). For example, the capture manifest may map data blocks captured by a data capture to data chunks in the high durability data store. In other words, the data chunk in which the requested file is located in the high durability data store may be identified by the file retrieval logic utilizing a capture manifest that maps a data block where the file is stored in the low latency data store to the data chunk where the file, as captured, is stored in the high durability data store.

In element 814, the identified data chunk is retrieved into a memory. The memory, in some embodiments, is a part of the file retrieval logic. In other words, once a data chunk is identified as containing the data block that stores the requested file, the data chunk is retrieved into memory. In element 816, the data block that stores the requested file is read from the data chunk to produce the requested file. Therefore, once the data chunk is received into the memory, the file retrieval logic may read the data block from the data chunk. In some embodiments, the data chunks may be streamed through the memory and the data blocks containing the file that has been captured at various points in time extracted from the memory. In element 818, the requested file, in some embodiments, is stored in a data store accessible to the client. Thus, the client is able to access the requested file as captured at a specific point in time. In alternative embodiments, the requested file may be streamed directly from the file retrieval logic to the client without first being stored.

Figure 9:
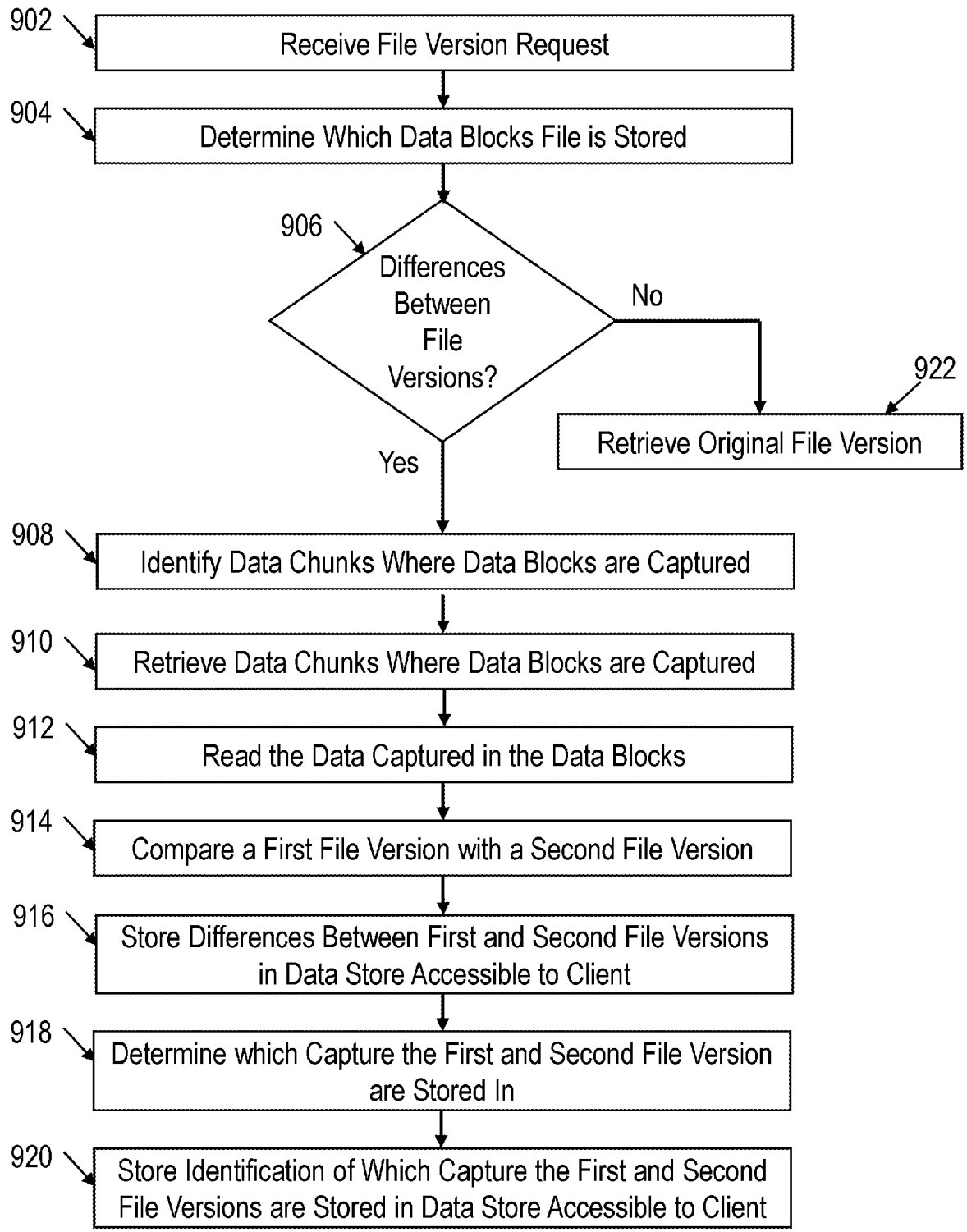
FIG. 9 shows a flow diagram illustrating aspects of operations that may be performed to retrieve and read various file versions from stored captured data in accordance with various embodiments.

FIG. 9 shows a flow diagram illustrating aspects of operations that may be performed to retrieve and read various file versions from stored captured data in accordance with various embodiments. As shown in element 902, a retrieval request is received from a client requesting the retrieval of various file versions. The file versions may comprise a file that has been captured at various points in time. Therefore, the request received in element 902 may be a request to retrieve a file as captured at various points in time. The request may be received by file retrieval logic residing in a virtual data store service of a distributed computing system. In element 904, a determination is made, in some embodiments by the file retrieval logic, as to which data blocks residing in a low latency data store (e.g., a block storage device) the file is stored. In some embodiments, file retrieval logic may utilize a file table, such as file table 402 that maps files to the data blocks in which the files are stored, to determine which data block or data blocks of the low latency data store the file is stored.

In element 906 a determination is made as to whether any differences between the file versions exist. Because in some embodiments, only the first capture may capture an entire file (i.e., the original file version). For subsequent captures, only data that has changed is captured. Thus, a determination may be made if there are any data blocks stored in the data chunks of the high durability data store that correspond to the file in any subsequent capture after the original capture. If there are no data blocks stored in subsequent captures that correspond with the file, then it may be determined that there are no differences between the file versions. However, if there are data blocks stored in subsequent captures that correspond with the file, then it may be determined that there are differences between the file versions. In some embodiments, a comparison of the capture manifests of a capture family may allow for this determination to be made.

If, in element 906, a determination is made that there are differences between the file versions, then in element 908, the data chunks of a high durability data store that store a capture of the data block or data blocks are identified, in some embodiments, by the file retrieval logic utilizing one or more capture manifests (e.g., capture manifests 162, 164, 166). For example, each capture manifest may map data blocks captured by a data capture to data chunks in the high durability data store. In other words, the data chunks in which the requested file versions are located in the high durability data store may be identified by the file retrieval logic utilizing capture manifests that map to a data block or data blocks where the file is stored in the low latency data store to the data chunk where the file as captured is stored in the high durability data store.

In element 910, the identified data chunks are retrieved into a memory. The memory, in some embodiments, is a part of the file retrieval logic. In other words, once a data chunk is identified as containing a data block that contains a version of a requested file, the data chunk is retrieved into memory. In element 912, the data blocks that store the requested file versions are read from the data chunks to produce the file versions. Therefore, once the data chunks are received into the memory, the file retrieval logic may read the data blocks from the data chunks and, in some embodiments, store the file versions contained in the data blocks in a data store accessible to the client. In some embodiments, the capture manifests may map specific bits and/or bytes in which the data block or data blocks are captured and stored in the data chunks of the high durability data store. Therefore, the file retrieval logic may read and extract those bits and/or bytes from the memory. In this way, the requested file versions may be read. In some embodiments, the data chunks may be streamed through the memory and the data blocks containing the file that has been captured at various points in time extracted from the memory. In some embodiments, the reading from the memory may occur while a first file version is being compared to a second file version in element 914.

In element 914, one of the file versions may be compared with a second file version. In other words, the file retrieval logic may compare different file versions read from the memory. In element 916, the differences between the file versions may be stored in the data store accessible to the client. In alternative embodiments, the differences may be streamed directly from the file retrieval logic to the client without first being stored. In element 918, determining determination is made as to which of the captures that are stored in the high durability data store the file versions have been read. For example, the file retrieval logic may determine that the read file versions are stored in certain specific captures (e.g., file version 1 is stored in capture 132). In element 920, an identification of which captures the file version are stored may be stored into a data store accessible to the client. For instance, once a determination is made by the file retrieval logic as to the specific captures that store the read file versions, that identification may be stored into a data store or streamed directly to the client.

If, in element 906, a determination is made that there are differences between the file versions, then in element 922, the original file version is retrieved. For example, because, in this embodiment, there are no differences between the file versions, no additional versions exist to be retrieved. Therefore, only the original file version may be retrieved. The original file may be retrieved by performing elements 908-912 by identifying the data chunks where the data block or blocks that store the file are captured, retrieving the data chunks where the data block or blocks that store the file are stored in the high durability data store, and reading the data captured in the retrieved data blocks. In alternative embodiments, instead of or in addition to retrieving the original file version, an error message is generated and transmitted to the requester.

Figure 10:
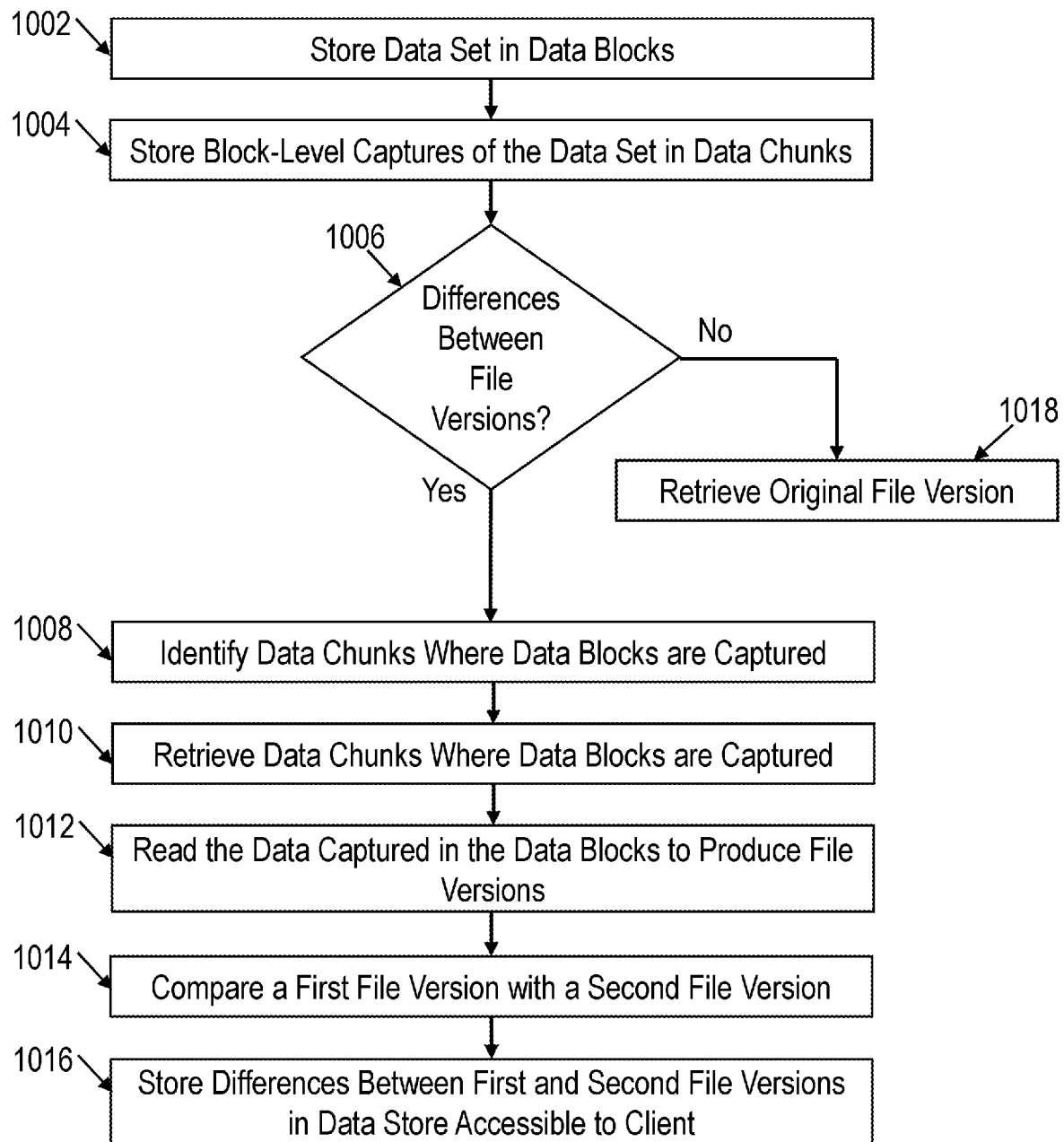
FIG. 10 shows a flow diagram illustrating aspects of operations that may be performed to retrieve and read various file versions from stored captured data in accordance with various embodiments.

FIG. 10 shows a flow diagram illustrating aspects of operations that may be performed to retrieve and read various file versions from stored captured data in accordance with various embodiments. As shown in element 1002, a data set is stored in multiple data blocks of a block storage device. For example, data set 124 may be stored in low latency data store 120. The data set may include multiple files. In some embodiments, one of the files may be stored in one of the data blocks of the storage device. In element 1004, multiple block-level captures of the data set are stored in a plurality of data chunks of a data store. In some embodiments, the data store in which the captures are stored is a high durability data store. Because the data set includes the one file stored in the data block, the captures include the file captured at different points in time.

In element 1006 a determination is made as to whether any differences between the file versions exist. Because in some embodiments, only the first capture may capture an entire file (i.e., the original file version). For subsequent captures, only data that has changed is captured. Thus, a determination may be made if there are any data blocks stored in the data chunks of the high durability data store that correspond to the file in any subsequent capture after the original capture. If there are no data blocks stored in subsequent captures that correspond with the file, then it may be determined that there are no differences between the file versions. However, if there are data blocks stored in subsequent captures that correspond with the file, then it may be determined that there are differences between the file versions. In some embodiments, a comparison of the capture manifests of a capture family may allow for this determination to be made.

If, in element 1006, a determination is made that there are differences between the file versions, then in element 1008, the data chunks of the data store that contain the file are identified. In some embodiments, the file retrieval logic utilizes one or more capture manifests (e.g., capture manifests 162, 164, 166) to identify the data chunks in which the file are stored. For example, each capture manifest may map data blocks captured by a data capture to data chunks in the data store. In other words, the data chunks in which the file is located in the data store may be identified by the file retrieval logic utilizing capture manifests that map a data block or data blocks where the file is stored in the block storage device to the data chunk where the file, as captured, is stored in the data store.

In element 1010, the data chunks, identified by the file retrieval logic, are retrieved into a memory. The memory, in some embodiments, is a part of the file retrieval logic. In other words, once a data chunk is identified as storing a data block that contains a version of the file, the data chunk is retrieved into memory. In element 1012, the data blocks that contain the file versions of the file are read from the data chunks to produce the file versions. Therefore, once the data chunks are received into the memory, the file retrieval logic may read the data blocks from the data chunks and, in some embodiments, store the file versions contained in the data blocks in a data store accessible to the client. Thus, the file, as captured at different points in time, is read and may be stored in a data store accessible to the client. In some embodiments, the capture manifests may map specific bits and/or bytes in which the data block or data blocks are captured and stored in the data chunks of the high durability data store. Therefore, the file retrieval logic may read and extract those bits and/or bytes from the memory. In this way, the requested file versions may be read. In some embodiments, the data chunks may be streamed through the memory and the data blocks containing the file that has been captured at various points in time extracted from the memory. In some embodiments, the reading from the memory may occur while a first file version is being compared to a second file version in element 1014.

In element 1014, one of the file versions may be compared with a second file version. In other words, the file retrieval logic may compare different file versions read from the memory. In element 1016, the differences between the file versions may be stored in the data store accessible to the client. The storing of the differences in the data store accessible to the client may include storing: the actual differences between the file versions (e.g., only the changes from one version of the file to another version of the file), a listing of which capture the file versions have been read from (e.g., file version 1 is from capture 132, file version 2 is from capture 134, file version 3 is from capture 136, etc.), and a listing of a time when each of the file versions was captured into the high durability data store 122 (e.g., file version 1 from capture 132 was captured on Jan. 1, 2015 at 12:30 a.m., file version 2 from capture 132 was captured on Jan. 2, 2015 at 12:30 a.m., file version 3 from capture 136 was captured on Jan. 3, 2015 at 12:30 a.m., etc.). In alternative embodiments, the differences may be streamed directly from the file retrieval logic to the client without first being stored.

If, in element 1006, a determination is made that there are not differences between the file versions, then in element 1018, the original file version is retrieved. For example, because, in this embodiment, there are no differences between the file versions, no additional versions exist to be retrieved. Therefore, only the original file version may be retrieved. The original file may be retrieved by performing elements 1008-1012 by identifying the data chunks where the data block or blocks that store the file are captured, retrieving the data chunks where the data block or blocks that store the file are stored in the high durability data store, and reading the data captured in the retrieved data blocks. In alternative embodiments, instead of or in addition to retrieving the original file version, an error message is generated and transmitted to the requester.

Figure 11:
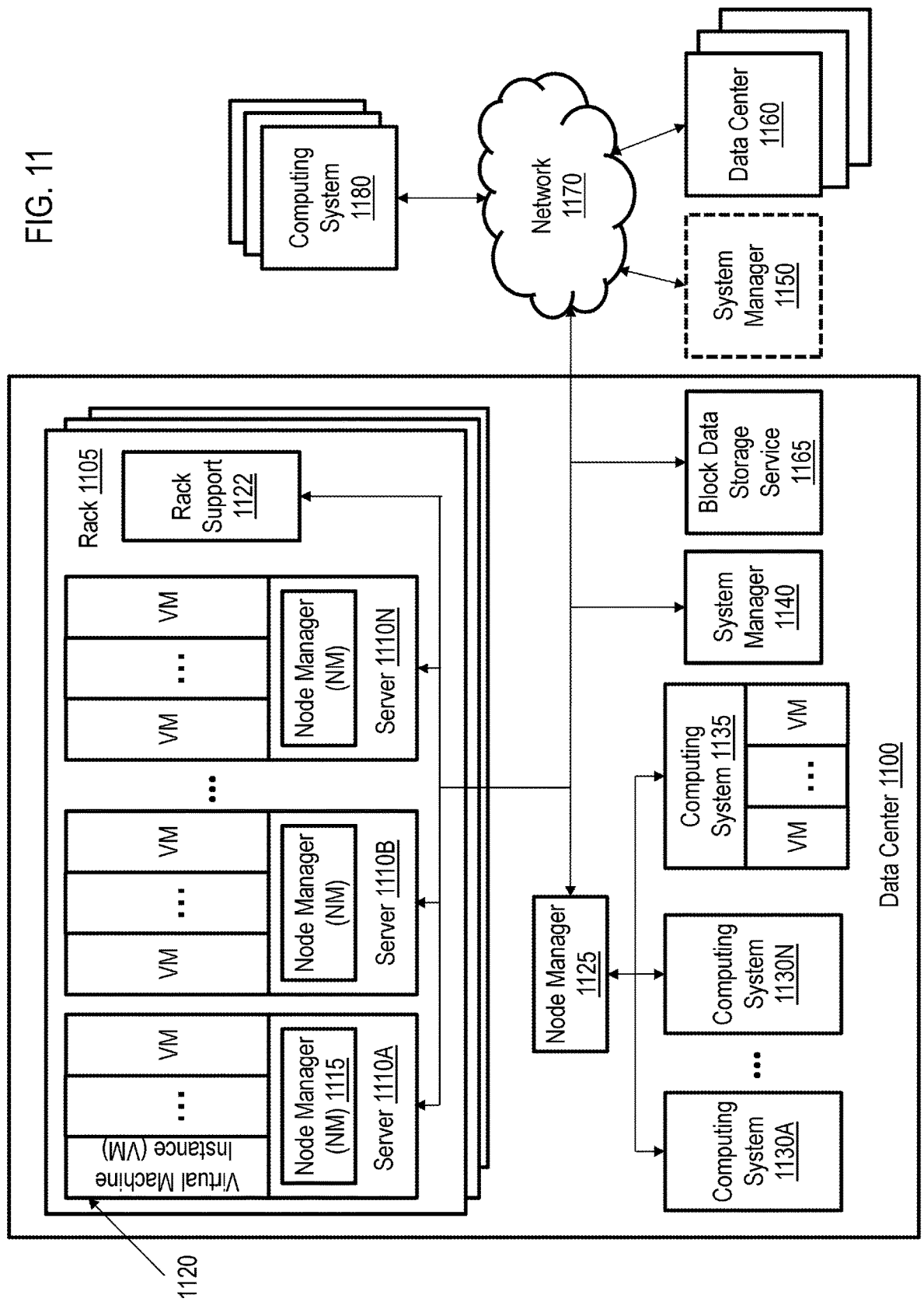
FIG. 11 shows a block diagram of a distributed computing environment in accordance with various embodiments.

In at least some embodiments, a portion or all of one or more of the technologies described herein, including the techniques to implement the file retrieval logic, the high durability data store, and the low latency data store, may be implemented in a distributed computing environment, such as shown in FIG. 11. In particular, in this example a program execution service manages the execution of programs on various computing systems located within a data center 1100, and a block storage service works in conjunction with multiple other storage systems at the data center to provide block-level storage to those executing programs.

Data center 1100 includes a number of racks 1105, and each rack includes a number of computing systems 1110A-N, as well as a rack support computing system 1122 in this example embodiment. The computing systems 1110 each host one or more virtual machine instances 1120 in this example, as well as a distinct node manager 1115 to manage the virtual machines. In this example, each virtual machine 1120 may be employed to provide an independent computing environment for executing an instance of program. In this example, the rack support computing system 1122 may provide various utility services for other computing systems local to the rack, as well as possibly to other computing systems located in the data center 1100. The utility services may include, for example, data and/or program storage for other computing systems, execution of one or more machine manager modules to support other computing systems, etc. Each computing system 1110 may alternatively have a distinct machine manager module (e.g., provided as part of the node manager for the computing system) and/or have local storage (not shown) to store local copies of programs. The computing systems 1110 and the rack support computing system 1122 all share a common data exchange medium in this example, and may all be part of a single group. This common data exchange medium may be connected to one or more external data exchange mediums shared by, for example, other racks or computing systems in the data center 1100.

In addition, the example data center 1100 further includes additional computing systems 1130A-N and 1135 that share a common data exchange medium with a node manager 1125, and node manager 1125 manages computing systems 1130 and 1135. In the illustrated example, computing system 1135 also hosts a number of virtual machines as execution environments for use in executing program instances for one or more users, while computing systems 1130 do not host distinct virtual machines. Additionally, an optional system manager computing system 1140 is also illustrated. The optional system manager computing system 1140 may assist in managing the execution of programs on other computing systems located within the data center 1100 (or optionally on computing systems located in one or more other data centers 1160). The optional system manager computing system 1140 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. Data center 1100 also may include a block storage service 1165 for providing block-level data storage to programs executing on computing nodes provided by host computing systems 1110, 1130, and 1135 located within data center 1100 or optionally computing systems (not shown) located within one or more other data centers 1160 or other remote computing systems 1180 available over a network 1170.

In this example, the data center 1100 is connected to a number of other systems via a network 1170 (e.g., the Internet), including additional computing systems 1180 that may be operated by the operator of the data center 1100 or third parties such as users, additional data centers 1160 that also may be operated by the operator of the data center 1100 or third parties, and an optional system manager 1150. In a manner similar to system manager 1140, the system manager 1150 may manage the execution of programs on computing systems located in one or more data centers 1100 and/or 1160, in addition to providing a variety of other services. Although the example system manager 1150 is depicted as external to any particular data center, in other embodiments it may be located within a data center, such as one of the data centers 1160.

Figure 12:
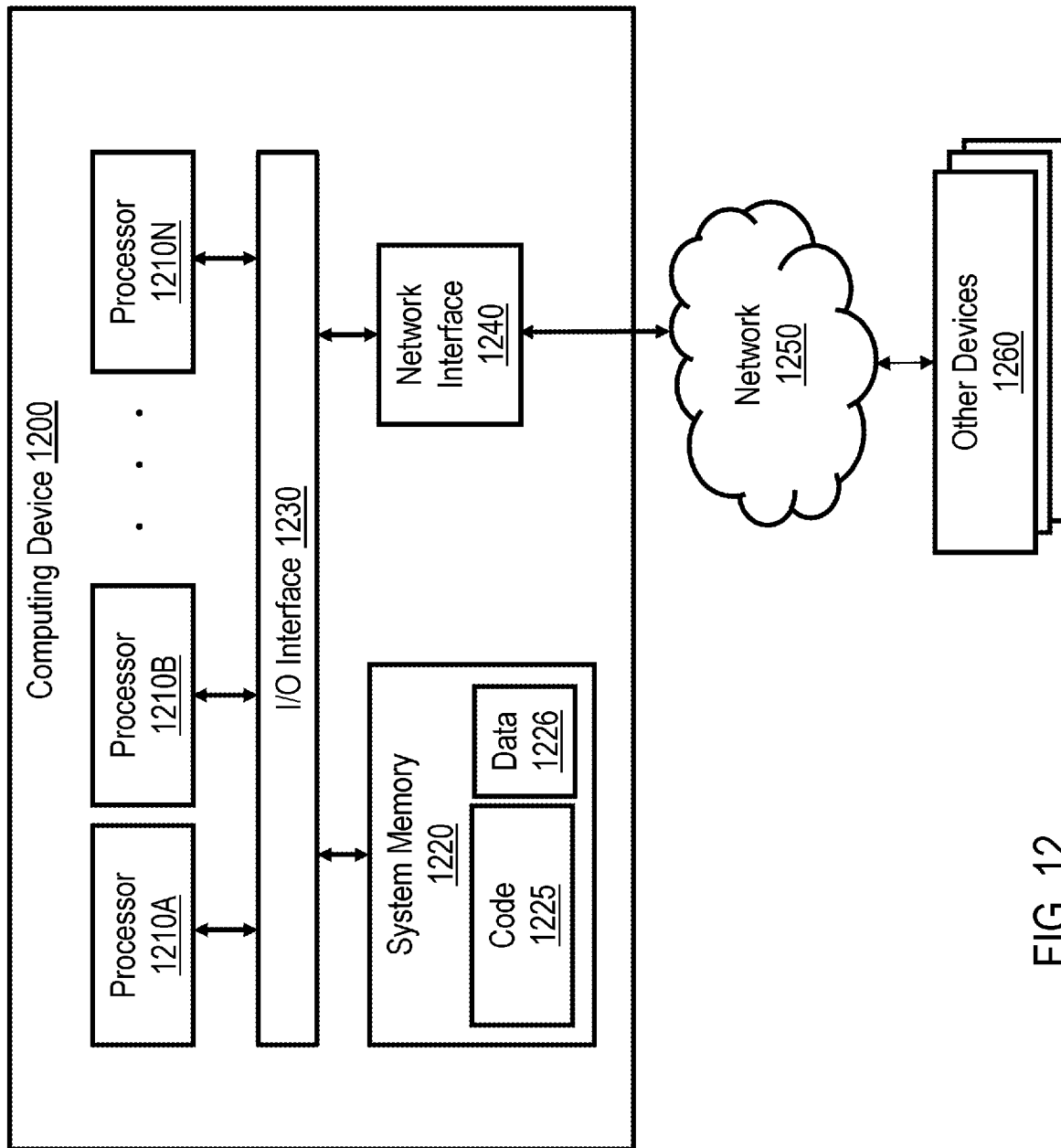
FIG. 12 shows a block diagram illustrating an example computing device in accordance with various embodiments.

In at least some embodiments, a server that implements a portion or all of one or more of the technologies described herein, may include a computer system that includes or is configured to access one or more computer-accessible media. FIG. 12 shows such a computing device 1200. In the illustrated embodiment, computing device 1200 includes one or more processors 1210 coupled to a system memory 1220 via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors. In some embodiments, file retrieval logic 150 is implemented by processors 1210.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1220 as code 1225 and data 1226

In one embodiment, I/O interface 1230 may be configured to coordinate I/O traffic between processor 1210, system memory 1220, and any peripheral devices in the device, including network interface 1240 or other peripheral interfaces such as various types of persistent and/or volatile storage devices used to store physical replicas of data object partitions. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 through FIG. 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the above discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   receiving a retrieval request for retrieval of a first file of a plurality of files stored in a first capture of a plurality of captures of a data set stored in a plurality of data blocks of a storage volume, the plurality of captures stored in a plurality of data chunks of a first data store;
   determining a first data block of the plurality of data blocks in which the first file is stored;
   in response to determining the first data block in which the first file is stored, identifying a first data chunk of the plurality of data chunks in which the first data block as captured in the first capture is stored in the first data store utilizing a capture manifest;
   retrieving into a memory the first data chunk; and
   reading the first data block as captured by the first capture from the first data chunk stored in the memory.

2. The method of claim 1, wherein the capture manifest comprises a table that maps data blocks of the plurality of data blocks captured in the first capture to a corresponding data chunk stored in the first data store.

3. The method of claim 1, wherein the reading the first data block of the first capture includes:
   streaming data blocks stored in the first data chunk through the memory; and
   extracting the first data block from the memory.

4. The method of claim 1, further comprising storing the first file stored in the first data block of the first capture in a second data store accessible to a client.

5. A system comprising:
   a storage volume configured to store a data set in a plurality of data blocks of a block storage device, the data set including a file associated with a first data block of the plurality of data blocks;
   a first data store configured to store a plurality of captures of the data set in a plurality of data chunks; and
   file retrieval logic including memory and one or more processors, wherein the one or more processors are configured to:
      receive a request for the file;
      use a first data structure that maps files to data blocks to identify the first data block associated with the file;
      in response to identifying, the first data block in which the file is stored, use a second data structure that maps data blocks to data chunks to identify a first data chunk mapped to the first data block;
      retrieve the identified first data chunk from the first data store; and
      read the first data block as captured in a first capture from the first data chunk.

6. The system of claim 5, wherein the file retrieval logic is configured to identify the first data chunk using a capture manifest.

7. The system of claim 6, wherein the capture manifest comprises a table that maps data blocks of the plurality of data blocks captured in the first capture to a corresponding data chunk stored in the first data store.

8. The system of claim 5, wherein the file retrieval logic is configured to store the retrieved first data chunk.

9. The system of claim 8, wherein the file retrieval logic is configured to retrieve data blocks stored in the first data chunk through the memory and extract the first data block from the memory.

10. The system of claim 5, wherein the file retrieval logic is configured to identify, retrieve, and read based on the file retrieval logic receiving a request from a client to retrieve the file from the first capture stored in the first data store.

11. The system of claim 10, wherein the request to retrieve the file is an application program interface (API) instruction received by the file retrieval logic.

12. The system of claim 5, wherein the file retrieval logic is further configured to store a result of the read into a second data store accessible to a client.

13. The system of claim 5, wherein the file retrieval logic is configured to determine the file is stored in the first data block by accessing a file table, the file table mapping a file in the data set to the plurality of data blocks.

14. A method comprising:
  storing a data set in a plurality of data blocks in a storage volume of a block storage device, the data set including a file associated with a first data block of the plurality of data blocks;
  storing a plurality of captures of the data set in a plurality of data chunks in a first data store;
  identifying the first data block of the storage volume in which the file is stored;
  in response to identifying, that the file is stored in the first data block, using a data structure that maps data blocks to data chunks, identifying a first data chunk of the plurality of data chunks where the first data block as captured in a first capture of the plurality of captures is stored;
  retrieving into a memory the first data chunk; and
  reading the first data block as captured from the first data chunk stored in the memory.

15. The method of claim 14, wherein the reading the first data block from the first data chunk stored in the memory includes extracting the first data block from the memory.

16. The method of claim 14, further comprising receiving an application program interface (API) instruction requesting to retrieve the file from the first capture stored in the first data store.

17. The method of claim 14, further comprising streaming a result of the reading.

18. The method of claim 14, further comprising accessing a file table to determine that the file is stored in the first data block of the storage volume, the file table mapping a file in the data set to the plurality of data blocks.

19. The method of claim 14, identifying the first data block utilizes a file system driver based on a type of file system stored in the storage volume.

* * * * *